United States Patent
Asnaashari et al.

(10) Patent No.: US 9,529,734 B2
(45) Date of Patent: *Dec. 27, 2016

(54) SMART STORAGE DEVICE

(71) Applicant: MICRON TECHNOLOGY, INC., Boise, ID (US)

(72) Inventors: Mehdi Asnaashari, Danville, CA (US); Tsai Victor, Palo Alto, CA (US)

(73) Assignee: Micron Technology, Inc., Boise, ID (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/506,031

(22) Filed: Oct. 3, 2014

(65) Prior Publication Data

US 2015/0026484 A1    Jan. 22, 2015

Related U.S. Application Data

(63) Continuation of application No. 11/938,681, filed on Nov. 12, 2007, now Pat. No. 8,887,270.

(51) Int. Cl.
| | | |
|---|---|---|
| G06F 21/42 | (2013.01) | |
| G06F 12/14 | (2006.01) | |
| G06F 21/77 | (2013.01) | |
| G06F 21/79 | (2013.01) | |
| H04L 9/08 | (2006.01) | |
| H04L 9/32 | (2006.01) | |
| G06F 21/60 | (2013.01) | |

(52) U.S. Cl.
CPC ......... *G06F 12/1408* (2013.01); *G06F 21/602* (2013.01); *G06F 21/77* (2013.01); *G06F 21/79* (2013.01); *H04L 9/0897* (2013.01); *H04L 9/3226* (2013.01); *G06F 2212/1052* (2013.01)

(58) Field of Classification Search
CPC .......... G06F 21/34; G06F 21/77; G06F 21/79; G06Q 20/341; H04L 9/0897; H04L 63/0853
USPC ............................................................ 726/9
See application file for complete search history.

(56) References Cited

U.S. PATENT DOCUMENTS

| | | |
|---|---|---|
| 5,623,637 A | 4/1997 | Jones et al. |
| 6,257,486 B1 | 7/2001 | Teicher et al. |
| 6,889,329 B1 | 5/2005 | DiGiorgio et al. |
| 8,156,322 B2 | 4/2012 | Asnaashari |
| 8,162,227 B2 | 4/2012 | Asnaashari |
| 8,286,883 B2 | 10/2012 | Asnaashari |
| 8,307,131 B2 | 11/2012 | Prevost |
| 2004/0059916 A1* | 3/2004 | Mizushima .......... G06Q 20/341 713/172 |
| 2005/0086471 A1 | 4/2005 | Spencer |
| 2006/0174352 A1 | 8/2006 | Thiadeau |
| 2006/0289659 A1 | 12/2006 | Mizushima |
| (Continued) | | |

FOREIGN PATENT DOCUMENTS

| | | |
|---|---|---|
| JP | 2002-312221 | 10/2002 |
| WO | 2006/120938 | 11/2006 |

*Primary Examiner* — Ellen Tran
(74) *Attorney, Agent, or Firm* — Dicke, Billig & Czaja, PLLC

(57) ABSTRACT

A smart storage device can have a smart-card portion with access control circuitry and integrated memory, a controller in selective communication with the smart-card portion, and a memory device in communication with the controller. The memory device can be separate from the smart-card portion and can store one or more smart-card applications.

17 Claims, 2 Drawing Sheets

(56) References Cited

U.S. PATENT DOCUMENTS

| | | |
|---|---|---|
| 2008/0107275 A1 | 5/2008 | Asnaashari |
| 2009/0070599 A1 | 3/2009 | Nishimura et al. |
| 2009/0125645 A1 | 5/2009 | Prevost |
| 2010/0023650 A1 | 1/2010 | Prevost |
| 2010/0023777 A1 | 1/2010 | Prevost |

* cited by examiner

US 9,529,734 B2

SMART STORAGE DEVICE

RELATED APPLICATION

This application is a continuation of U.S. application Ser. No. 11/938,681, titled "SMART STORAGE DEVICE," filed Nov. 12, 2007 and issued as U.S. Pat. No. 8,887,270 on Nov. 11, 2014, which is incorporated herein by reference in its entirety.

FIELD

The present disclosure relates generally to storage devices and in particular the present disclosure relates to smart storage devices.

BACKGROUND

Chip cards or integrated circuit cards both of which are commonly known as smart cards, TPM (trusted platform Module) ICs, or the like, are devices with an embedded integrated circuit, such as a microprocessor and/or memory. The memory, such as an EEPROM (electrically eraseable programmable read only memory) or the like may store an operating system of the smart card, smart-card applications, such as electronic banking applications, telephone applications in the case of SIM (subscriber identity module) smart cards, or the like. The memory may also store user authentication protocols, personalization data, such as telephone or bank account data or the like, user data, such as financial data or the like, private data, such as private keys and/or certificates used in various encryption techniques, etc. User data may be secured using a PIN (personal identification number) or a password as an access control measure. In order to access the protected data stored in the card's memory, a user must be authenticated by providing the correct PIN or password. One problem with smart cards is larger and more costly embedded integrated memory may be needed in order to meet a demand for increased storage capacity for storing additional and/or more complex applications, user data, etc.

DETAILED DESCRIPTION

Figure 1:
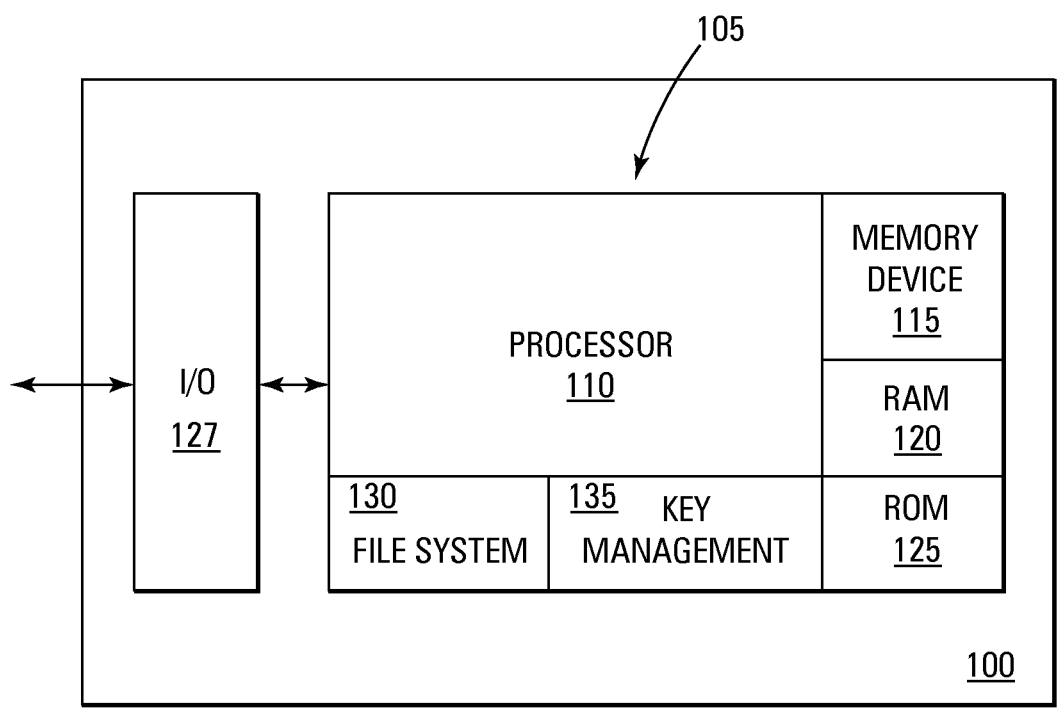
FIG. 1 is a block diagram illustration of an integrated circuit card of the prior art.

In the following detailed description, reference is made to the accompanying drawings that form a part hereof, and in which is shown, by way of illustration, specific embodiments. In the drawings, like numerals describe substantially similar components throughout the several views. Other embodiments may be utilized and structural, logical, and electrical changes may be made without departing from the present disclosure. The following detailed description is, therefore, not to be taken in a limiting sense.

FIG. 1 is a block diagram illustration of an integrated circuit card, such as a smart card 100, a SIM card, an electronic transaction card, an electronic identification card, a TPM (trusted platform Module) IC, or the like, of the prior art. A central processing unit 105 is embedded in smart card 100 and may include a processor 110 and an integrated memory with RAM (random access memory) 120, a non-volatile memory 115, such as an EEPROM, and ROM (read only memory) 125. Processor 110 may include an encryption engine, such as an AES (advanced encryption system) encryption engine, e.g., as a portion of access control circuitry of central processing unit 105, that can perform AES protocols, user authentication protocols, such as PKI (Public Key Infrastructure) authentication, encryption and decryption of data, etc. An input/output interface 127 is in communication with the central processing unit and may be a USB (universal serial bus) interface for connecting directly to a host, such as a personal computer, a contactless interface, an ISO 7816 interface for use with an ISO 7816 card reader, etc. ROM 125 typically stores the operating system of smart card 100. Non-volatile memory 115 may be configured to include a file system 130 that may store private keys, certificates that may include public keys as part of public/private key encryption, applications, such as electronic banking applications, telephone applications, etc. Non-volatile memory 115 also includes key management system 135 for managing and storing one or more encryption and/or decryption keys, such as one or more AES encryption and/or decryption keys or the like. Non-volatile memory 115 may further include upgrades or patches for the smart card operating system.

During operation, smart card 100 is placed in communication with a host device via a card reader, for example. An identifier, such as PIN or password, is input into the host device by as user. The reader may then pass the user-entered identifier on to smart card 100 for verification so that the smart card can authenticate the user. Smart card 100 then indicates to the host device that the user is either authenticated or not authenticated. Alternatively, smart card 100 may be in direct communication with the host device via a USB interface, for example. In which case, the identifier is input into the host device and is then passed directly to smart card 100 via the USB interface for authentication of the user. After user authentication, processor 110 either decrypts data from non-volatile memory 115 for output to the host device or encrypts data received from the host for storage in non-volatile memory 115, e.g., using one or more encryption and/or decryption keys, such as AES keys, from key management system 135.

Figure 2:
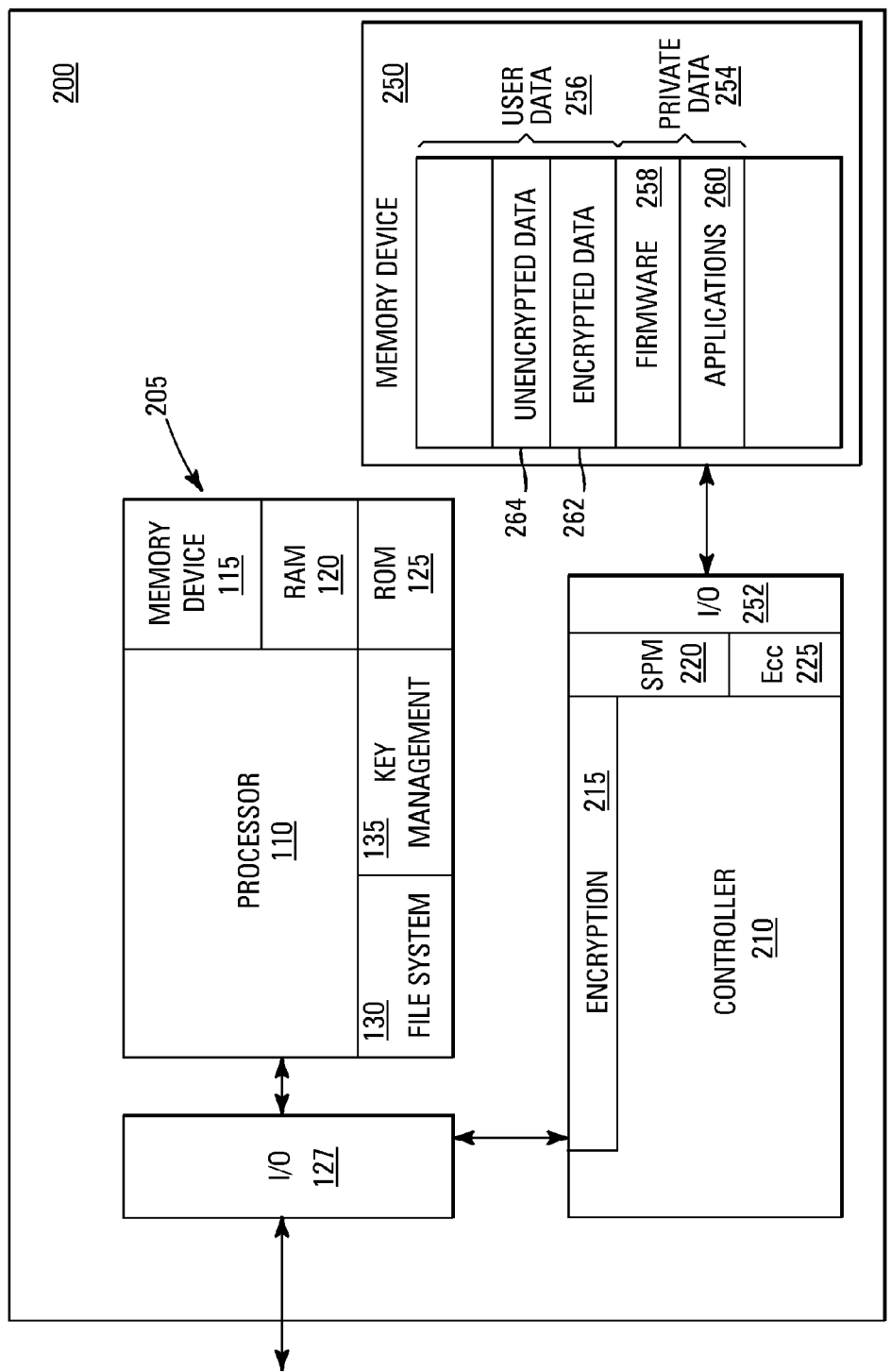
FIG. 2 is a block diagram illustration of an embodiment of a storage device, according to an embodiment of the disclosure.

FIG. 2 is a block diagram illustration of a storage device 200, e.g., a smart storage device, according to an embodiment. Common reference numbers are used to denote substantially similar elements in FIGS. 1 and 2. For one embodiment, storage device 200 may include a smart-card portion 205 having components similar to those of smart card 100, such as access control circuitry and integrated memory, e.g., for authenticating a user to storage device 200, storing and managing one or more encryption and/or decryption keys, such as AES keys, private keys, etc.

Storage device 200 may include a controller 210, such as a memory controller, e.g., a flash memory controller, that is in selective communication with smart-card portion 205. For one embodiment, smart-card portion 205 and controller 210 may be separate chips disposed on a circuit board. Alternatively, smart-card portion 205 may be integrated within controller 210 so that controller 210 can authenticate users, store and manage one or more encryption and/or decryption keys, private keys, etc. For example, smart-card functionality may be integrated into controller 210.

For another embodiment, controller 210 may include an encryption engine 215, such as an AES encryption engine, that is separate from the encryption engine smart-card portion 205. For example, the encryption engine of smart-card portion 205 may be used for user authentication, while encryption engine 215 may receive one or more encryption and/or decryption keys from smart-card portion 205 when the user is authenticated, e.g., in response to the user inputting a correct identifier, such as a password or PIN. This enables encryption engine 215 to perform encryption and/or decryption, using the one or more encryption and/or decryption keys from smart-card portion 205 independently of, e.g., without resorting to, the encryption engine of smart-card portion 205.

Controller 210 may include space management sector 220 and error correction codes 225. Controller 210 is in communication with a memory device 250, such as a flash memory device, e.g., a NAND flash memory device, via an input/output interface 252, such as a flash memory interface. Input/output interface 252 may include a control link over which memory device 250 can receive control signals from controller 210, an address link over which memory device 250 can receive address signals from controller 210, and a data (DQ) link over which memory device 250 can receive data from controller 210 and send data to controller 210. Note that memory device 250 may be external to and separate from smart-card portion 205.

Memory device 250 may include a private data portion 254 that may or may not be accessible to a user and a user data portion 256 that is accessible to the user. For one embodiment, private data portion 254 may include firmware 258 that may include a control state machine for controlling operations on a memory array of memory device 250 in response to control and address signals from controller 210. For another embodiment, private data portion 254 includes smart-card applications data, such as smart-card applications 260, e.g., electronic transaction applications, electronic banking applications, telephone applications, etc., that might otherwise be stored in non-volatile memory 115 of smart-card portion 205.

Storing smart-card applications in memory device 250 instead of non-volatile memory 115 facilitates a reduction of the memory requirements of non-volatile memory 115 and thus the size of non-volatile memory 115 that would otherwise be required when these applications are stored in non-volatile memory 115. In addition, storing smart-card applications in memory device 250 enables the storage of larger and more sophisticated smart-card applications and the storage of a larger number of applications compared to when smart-card applications are stored in the non-volatile memory 115 of smart-card portion 205. For one embodiment, the applications may be stored in memory device 250 during fabrication of memory device 250. For another embodiment, the applications data and/or other data may be encrypted before they are stored in memory device 250.

During operation, according to one embodiment, storage device 200 is in communication with a host device. For example, storage device 200 may be in communication with a card reader via input/output interface 127 that is in communication with the host device. Alternatively, storage device 200 may be in direct communication with the host device. An identifier, such as a user PIN or password, is input into the host device, and the host device sends, e.g., transmits the identifier to smart-card portion 205 for verification to authenticate the user to smart-card portion 205 and to controller 210. Smart-card portion 205 then transmits a signal to the host, indicating whether or not the identifier is correct and thus whether or not the user is authenticated.

For one embodiment, controller 210 monitors the transmissions between the host and smart-card portion 205 and detects whether or not the identifier received at smart card portion 205 is correct and thus whether or not the user is authenticated. After the authentication, controller 210 may request the encryption and/or decryption keys from smart card portion 205. If smart card portion 205 has accepted the identifier and if controller 210 didn't make a mistake in detecting that the identifier is correct, smart card portion 205 will then send the encryption and/or decryption keys to controller 210. The encryption and/or decryption keys that are sent from smart card portion 205 to controller 210 are encrypted on the interface between controller 210 and smart card portion 205 and are decrypted inside controller 210. Note that for one embodiment, if controller 210 mistakenly detects that the user is authenticated at smart card portion 205 when in fact the identifier is incorrect and the user has failed to authenticate, smart card portion 205 may send an error message to controller 210 when controller requests the encryption and/or decryption keys.

When controller 210 receives a signal, indicating that the identifier is correct, the user is authenticated to controller 210, and controller 210 will load the encryption engine 215 with one or more encryption and/or decryption keys from smart-card portion 205. However, when controller 210 receives a signal, indicating that the identifier is incorrect, the user fails to authenticate to controller 210, and controller 210 prevents encryption engine 215 from receiving the one or more encryption and/or decryption keys from smart-card portion 205.

After user authentication, smart-card portion 205 can transmit the one or more encryption and/or decryption keys to encryption engine 215. Encryption engine 215 can then use the one or more encryption keys to encrypt user data from the host that is received at controller 210 directly from input/output interface 127 without going through smart-card portion 205. Controller 210 sends the encrypted user data to the user data portion 256 of memory device 250 via input/output interface 252. Encryption engine 215 can also use the one or more decryption keys to decrypt user data received at controller 210 from the user data portion 256 of memory device 250 via input/output interface 252. Encryption engine 215 can then send the decrypted user data directly to input/output interface 127, without going through smart-card portion 205, so that the decrypted user data can be sent to the host via input/output interface 127.

For another embodiment, controller 215 may be set so that data from the host bypasses encryption engine 215 and is thus not encrypted. Controller 210 may then transmit the unencrypted data to user data portion 256 of memory device 250. Controller 215 may also be set so that unencrypted data from user data portion 256 of memory device 250 bypasses encryption engine 215 and is sent to the host via input/output interface 127. For one embodiment, storage device 200 may be operated with controller 210 in the bypass mode without requiring authentication of the user. For another embodiment, user data portion 256 of memory device 250 may include an encrypted, e.g., a password protected, portion (which may also be referred to as a layer) 262 that stores the encrypted data and an unencrypted portion (which may also be referred to as a layer) 264 that stores the unencrypted data, as shown in FIG. 2. Therefore, for some embodiments, user authentication may not be required when controller 215 is only accessing unencrypted portion 254 of memory device 250.

For other embodiments, storage device 200 may run the smart-card applications stored in memory device 250. For example, one or more smart-card applications 260 that are stored in private data portion 254 may be decrypted as they are loaded into controller 210, e.g., using the one or more decryption keys received from smart-card portion 205, such as when a user's password is correct. Subsequently, controller 210 runs the one or more decrypted smart-card applications 260. For another embodiment, controller 210 may be operated in the bypass mode, which places smart-card portion 205 in direct communication with memory device 250, so that smart-card portion 205 can run one or more smart-card applications 260 directly from memory device 250.

In another embodiment, controller 210 receives one or more applications 260 from memory device 250 and sends the one or more smart-card applications 260 to smart-card portion 205. Smart-card portion 205 then runs the one or more smart-card applications 260. For one embodiment, the one or more applications 260 are not received at controller 210 until after the user has authenticated to smart-card portion 205 and to controller 210, as described above. For example, until after a correct user identifier is received at smart-card portion 205. For another embodiment, after the user has authenticated (e.g., a correct user identifier is received at smart-card portion 205), one or more decryption keys are sent to controller 210 from smart-card portion 205, and the one or more applications 260 are decrypted at controller 210 using the one or more decryption keys.

For another embodiment, the private data, such as smart-card applications 260 and/or updates to firmware 258, may be downloaded from a host device via input/output interface 127 when the host device is in communication with the Internet, for example. The private data may include an identifier, such as a password or public key, that is authenticated at smart-card portion 205. For example, the host transmits the identifier for the private data to smart-card portion 205, and smart-card portion 205 determines whether or not the identifier is correct.

When controller 210 receives a signal, indicating that the identifier is correct, the private data is authenticated to controller 210, and controller 210 allows encryption engine 215 to receive one or more encryption and/or decryption keys from smart-card portion 205. However, when controller 210 receives a signal, indicating that the identifier is incorrect, the private data fails to authenticate to smart-card portion 205 and thus controller 210, and controller 210 prevents encryption engine 215 from receiving the one or more encryption and/or decryption keys from smart-card portion 205. Note that controller 210 may receive the signal from either smart-card portion 205 or from the host as a result of controller 210 monitoring transmissions between the host and smart-card portion 205, as discussed above.

Encryption engine 215 uses the one or more encryption keys to encrypt the private data from the host received at controller 210 directly from input/output interface 127 without going through smart-card portion 205. Controller 210 sends the encrypted private data to the private data portion 254 of memory device 250 via input/output interface 252.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments. It is manifestly intended that the embodiments be limited only by the following claims and equivalents thereof.

What is claimed is:

1. A storage device, comprising:
a smart-card portion comprising a first encryption engine;
a controller separate from the smart-card portion in selective communication with the smart-card portion, the controller comprising a second encryption engine that is separate from the first encryption engine; and
a memory device in communication with the controller, the memory device separate from the smart-card portion;
wherein the controller is configured load the second encryption engine with an encryption key received from the smart-card portion and/or a decryption key received from the smart-card portion; and
wherein the second encryption engine is configured to use the decryption key to decrypt a smart-card application from the memory device, the controller is configured to transmit the decrypted smart-card application from the second encryption engine to the smart-card portion, and the smart-card portion is configured to run the decrypted smart-card application from the second encryption engine.

2. The storage device of claim 1, wherein the smart-card portion comprises access control circuitry.

3. The storage device of claim 1, wherein the memory device stores the smart-card application in a private portion that is not accessible to a user.

4. The storage device of claim 1, wherein the controller is configured load the second encryption engine with the encryption key received from the smart-card portion and/or the decryption key received from the smart-card portion after the smart-card portion authenticates a user to the controller.

5. The storage device of claim 1, wherein the smart-card portion and the controller are on separate chips disposed on a circuit board.

6. The storage device of claim 1, wherein the controller comprises a space management sector.

7. The storage device of claim 1, wherein the controller comprises error correction codes.

8. The storage device of claim 1, wherein the controller is a flash memory controller.

9. The storage device of claim 1, wherein the controller is in communication with the memory device over an input/output interface that comprises a control link, an address link, and a data link.

10. The storage device of claim 1, wherein the memory device comprises a private portion that is not accessible to a user and that comprises a control state machine for controlling operations on a memory array of the memory device.

11. A storage device, comprising:
a smart-card portion comprising a first encryption engine;
a controller separate from the smart-card portion in selective communication with the smart-card portion, the controller comprising a second encryption engine that is separate from the first encryption engine; and
a memory device in communication with the controller, the memory device separate from the smart-card portion;
wherein the controller is configured load the second encryption engine with an encryption key received from the smart-card portion and/or a decryption key received from the smart-card portion; and
wherein the controller is configured to receive an encrypted smart-card application from the memory device, to decrypt the encrypted smart-card application at the second encryption engine using the decryption key received from the smart-card portion, and to run the decrypted smart-card application.

12. The storage device of claim 11, wherein the second encryption engine is configured to use the encryption key to encrypt data received at the controller and the controller is configured to send the encrypted data to the memory device for storage.

13. The storage device of claim 12, wherein the smart-card portion is configured to authenticate the data to the controller, and wherein the controller is configured load the second encryption engine with the encryption key received from the smart-card portion only after the smart-card portion authenticates the data to the controller.

14. The storage device of claim 11, wherein the second encryption engine is configured to use the decryption key to decrypt data from the memory device and the controller is configured to transmit the decrypted data from the controller to a host device.

15. The storage device of claim 11, wherein the controller is configured to selectively operate in a bypass mode so that unencrypted data received at the controller from a host bypasses the second encryption engine and is sent from the controller to the memory device and/or so that unencrypted data received at the controller from the memory device bypasses the second encryption engine and is sent from the controller to the host.

16. A method of operating a storage device, comprising:
using a smart-card portion of the storage device to authenticate a user to a controller of the storage device, wherein the controller is in selective communication with and separate from the smart-card portion, the smart-card portion comprising a first encryption engine, the controller comprising a second encryption engine separate from the first encryption engine;
receiving an encrypted smart-card application at the controller from a memory device of the storage device that is in communication with the controller, the memory device separate from the smart-card portion;
receiving a decryption key at the controller from the smart-card portion after the user is authenticated to the controller;
using the controller to load the second encryption engine with the decryption key received at the controller from the smart-card portion, wherein the controller uses the decryption key received from the smart-card portion to decrypt the encrypted smart-card application at the second encryption engine; and
running the smart-card application on the controller.

17. A method of operating a storage device, comprising:
receiving an encrypted smart-card application at a controller of the storage device from a memory device of the storage device that is in communication with the controller, the controller comprising a first encryption engine;
receiving a decryption key at the controller from a smart-card portion of the storage device after a user is authenticated to the controller, the smart-card portion separate from the memory device and comprising a second encryption engine that is separate from the first encryption engine, the controller separate from the smart-card portion and in selective communication with the smart-card portion;
using the controller to load the first encryption engine with the decryption key received at the controller from the smart-card portion, wherein the first encryption engine uses the decryption key to decrypt the encrypted smart-card application received from the memory device;
using the controller to transmit the decrypted smart-card application from the controller first encryption engine to the smart-card portion; and
running the decrypted smart-card application from the first encryption engine on the smart-card portion.

* * * * *

UNITED STATES PATENT AND TRADEMARK OFFICE
CERTIFICATE OF CORRECTION

| | |
|---|---|
| PATENT NO. | : 9,529,734 B2 |
| APPLICATION NO. | : 14/506031 |
| DATED | : December 27, 2016 |
| INVENTOR(S) | : Asnaashari et al. |

It is certified that error appears in the above-identified patent and that said Letters Patent is hereby corrected as shown below:

In the Claims

Column 8, Line 33, delete "the controller" and insert in place thereof --the--.

Signed and Sealed this
Fourth Day of April, 2017

Michelle K. Lee
*Director of the United States Patent and Trademark Office*